United States Patent
Leao et al.

(10) Patent No.: US 11,888,956 B2
(45) Date of Patent: Jan. 30, 2024

(54) PAGINATED DATA TRANSFER TECHNIQUES

(71) Applicant: Microsoft Technology Licensing, LLC, Redmond, WA (US)

(72) Inventors: Matheus De Oliveira Leao, Seattle, WA (US); Raphael Ghelman, Kirkland, WA (US); Eli Cortez Custodio Vilarinho, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/345,346

(22) Filed: Jun. 11, 2021

(65) Prior Publication Data

US 2022/0400160 A1 Dec. 15, 2022

(51) Int. Cl.
*H04L 67/60* (2022.01)
*G06F 16/2458* (2019.01)

(52) U.S. Cl.
CPC .......... *H04L 67/60* (2022.05); *G06F 16/2474* (2019.01)

(58) Field of Classification Search
None
See application file for complete search history.

(56) References Cited

U.S. PATENT DOCUMENTS

| | | | |
|---|---|---|---|
| 8,051,180 B2 | 11/2011 | Mazzaferri et al. | |
| 9,465,587 B2 | 10/2016 | Pasternak | |
| 9,851,952 B2 | 12/2017 | Rodrigues et al. | |
| 10,069,938 B1 | 9/2018 | Zhang et al. | |
| 10,305,985 B1 | 5/2019 | Ma et al. | |
| 10,348,804 B2 * | 7/2019 | Sprigg | H04L 67/06 |
| 10,834,054 B2 | 11/2020 | Subbarayan et al. | |
| 2012/0303818 A1 | 11/2012 | Thibeault et al. | |
| 2017/0300552 A1 * | 10/2017 | Mandadi | G06F 16/9024 |
| 2017/0337288 A1 * | 11/2017 | Klinker | G06F 16/954 |
| 2019/0273769 A1 | 9/2019 | Lahore-carratÉ et al. | |
| 2021/0044639 A1 | 2/2021 | Tielemans et al. | |

OTHER PUBLICATIONS

"Invitation to Pay Additional Fee Issued in PCT Application No. PCT/US22/028655", dated Aug. 9, 2022, 12 Pages.

(Continued)

*Primary Examiner* — Scott B Christensen

(57) ABSTRACT

In examples, a requestor device requests data from a data platform. A response from the data platform may include a version identifier indicating a version of data used to process the request and a device identifier indicating the server device that processed the request. Accordingly, the requestor device may include the version identifier and device identifier in a subsequent request, such that the request is routed to the server device accordingly. In examples, the server device may evaluate the version identifier to determine whether the request is associated with a different version of the data, as may occur when the data of the server device has since been updated. Similarly, the requestor device may evaluate a version identifier from the data platform as compared to that of a previously received response to determine whether the response is associated with a different version of data than that of a previous response.

20 Claims, 12 Drawing Sheets

(56) References Cited

OTHER PUBLICATIONS

"Jira Service Management Cloud Developer REST API", Retrieved from: https://web.archive.org/web/20200805024807/https://developer.atlassian.com/cloud/jira/service-desk/rest/intro/, Aug. 5, 2020, 9 Pages.

"Managing Database Workload Using Services", Retrieved from: https://web.archive.org/web/20201029072133if_/https:/docs.oracle.com/cd/B19306_01/rac.102/b28759/configwlm.htm#TDPRC007, Oct. 29, 2020, 16 Pages.

"Resource Controller", Retrieved from: https://cloud.ibm.com/apidocs/resource-controller/resource-controller#pagination, May 5, 2021, 104 Pages.

"REST API", Retrieved from: https://pipedream.com/docs/api/rest/#overview, Retrieved Date: May 5, 2021, 30 Pages.

"Virtual Machines REST API", Retrieved from: https://www.ibm.com/docs/en/cloud-pak-system-w3550/2.3.3?topic=wm-virtual-machines, Retrieved Date: May 5, 2021, 7 Pages.

"Zalando Restful API and Event Guidelines", Retrieved from: https://web.archive.org/web/20201230153150/https:/opensource.zalando.com/restful-api-guidelines/, Dec. 30, 2020, 116 Pages.

"International Search Report and Written Opinion Issued in PCT Application No. PCT/US22/028655", dated Sep. 30, 2022, 19 Pages.

\* cited by examiner

PAGINATED DATA TRANSFER TECHNIQUES

BACKGROUND

In examples, data may be retrieved from a data platform using a request. However, the amount of data associated with a request may make it difficult to retrieve all of the data using a single request (e.g., as a result of bandwidth, processing, or time constraints). Even so, ensuring data consistency across multiple requests may be challenging, as may be the case in instances where requests may be processed by different server devices and the data stored by each server device may not be the same or may change between requests.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to paginated data transfer techniques. In an example, a requestor device requests data from a data platform, for example using an application programming interface (API) call. The response from the data platform may include a version identifier associated with a version of data that was used to process the request and a device identifier associated with the server device that processed the request. The requestor device may include the version identifier and device identifier in a subsequent request to the data platform, such that the request may be routed to the server device according to the device identifier.

In examples, the server device may evaluate the version identifier to determine whether the request is associated with a different version of the data, as may be the case when the data of the server device has since been updated. Similarly, the requestor device may evaluate a version identifier received in a response from the data platform as compared to that of a previously received response to determine whether the response is associated with a different version of data than that of the previously received response.

Thus, the device identifier enables subsequent requests to be routed to a server device that previously handled a request from the requestor device, which reduces the likelihood that a server device having a different data version will process subsequent requests of the requestor device. Further, the version identifier enables server devices and/or requestor devices to identify data version changes, such that one or more actions may be taken accordingly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
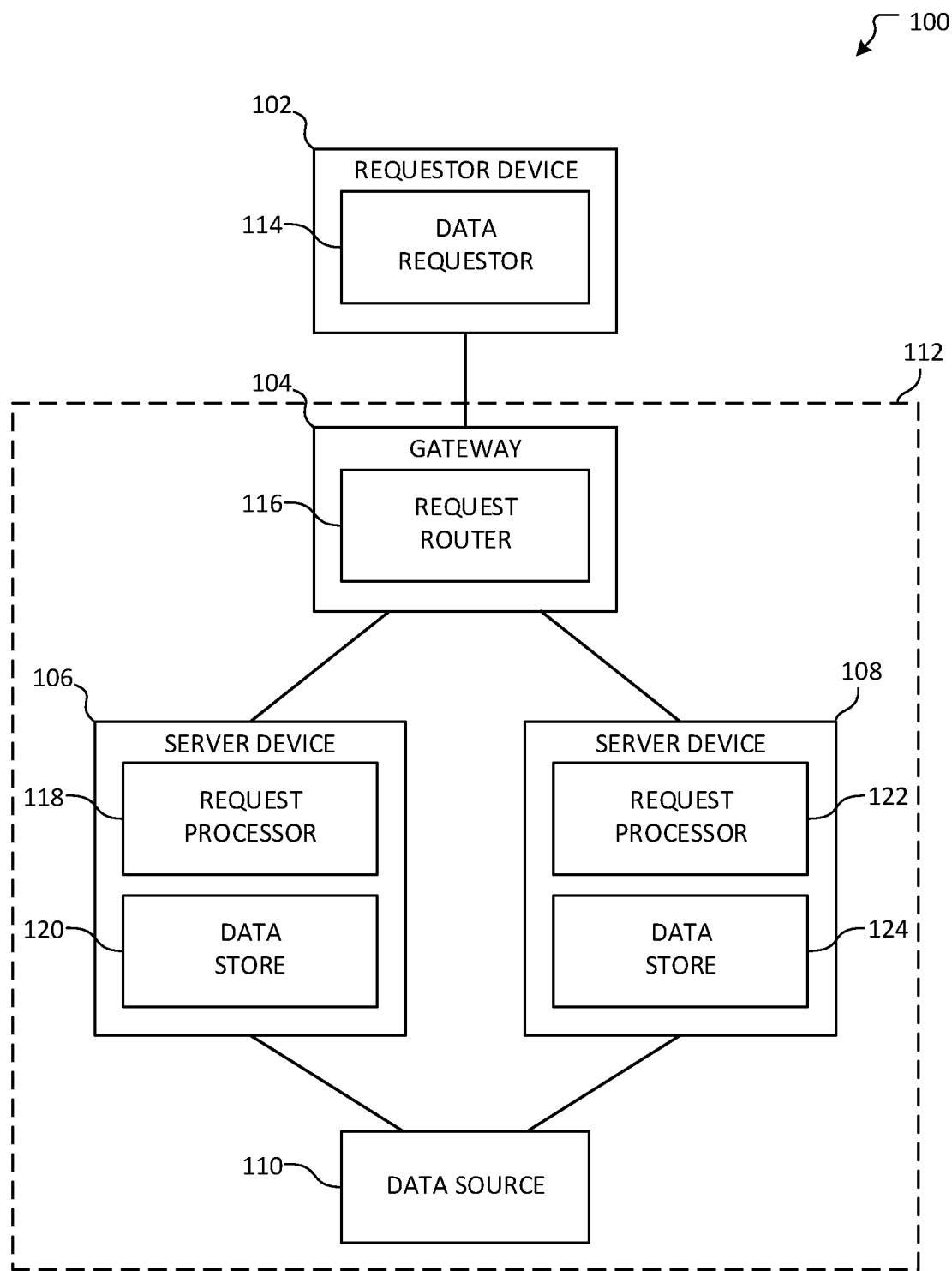
FIG. 1 illustrates an overview of an example system in which aspects of the paginated data transfer techniques described herein may be implemented.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a data platform may provide an application programming interface (API) with which to retrieve data from the data platform. For example, the API may use the representational state transfer (REST) architecture. In such an example, the data platform need not maintain client state information associated with requestor devices, for example which devices are requesting which data. Rather, a requestor device may include an indication as to the requested data in its request. As a result, the data platform may process a request according to information contained within the request (e.g., rather than client state information associated with the requestor device).

However, in some instances, it may be not be practical to retrieve the full set of data of the data platform (e.g., that is responsive to a given API call or search query) in a single request, for example as a result of bandwidth, processing, or time constraints. Accordingly, pagination may be used, where a page of data is returned in response to a request. As used herein, a page of data may comprise a count of bytes or a count of records, among other example units of data, where all pages except the last page comprise the count of bytes or records. In examples, the count may be predetermined (e.g., according to the protocol implemented by the data platform), indicated by a requestor device, or a combination thereof (e.g., where a requestor device may override a default specified by the data platform). A requestor device may issue multiple requests according to such pagination techniques, for example to request an initial page of data (e.g., according to a default offset of zero, such that the first page of data of the data platform is retrieved) and subsequent requests for additional pages of the data (e.g., according to a specified offset, such that a count of records after the specified offset are retrieved as a subsequent page of data). A subsequent request may include a subsequent page indication, such as an offset that indicates a next page of data based on data that has already been obtained from the data platform. Using the subsequent page indication, a subsequent page of data may be obtained from the data platform accordingly. It will be appreciated that any of a variety of additional or alternative information may be used to request subsequent data. For example, a data platform may include an indication as to a subsequent offset or identifier of a next page in response to a request.

Further, the data platform may utilize multiple server devices to process data requests. In some examples, the data with which requests are processed may not be consistent across server devices of the data platform. For example, each server device may have a local data store in which at least a part of data from a data source is stored, such that the local data store may be periodically updated with data from the data source. Moreover, the data platform may be a desynchronized-update data platform, where no guarantee is provided that all the server devices are providing the same version of the data. As a result, if a first request is processed by a server device having a first version of the data and a second request is processed by a server device having a second version of the data, the requestor device may receive incomplete data or duplicative data, or may otherwise exhibit unexpected behavior. Additionally, given a data platform may not maintain client state information, a server device of the data platform may be unaware and therefore unable to address such instances where a requestor device receives incomplete or duplicative data, even if the requestor device communicates with the same server device.

Accordingly, aspects of the present disclosure relate to paginated data transfer techniques. In an example, a response from a data platform may comprise a version identifier and a device identifier. A requestor device may then include the version identifier and device identifier in a subsequent request to the data platform, such that the data platform may route the request to a server device according to the device identifier. In examples, the server device may evaluate the version identifier to determine whether the request is associated with a different version of the data than the server's current version of the data. In instances where it is determined that the request is for a different version of the data, the server device may provide an indication of the server's current version of the data. In addition, in some implementations the server device may also provide an initial page of data in response to the request. For example, a requestor device may receive an initial page of data, even when a different page of data was requested by the requestor device. This can reduce network utilization, as the requestor would not then need to request the initial page of the server's version of the data explicitly in a later request. Similarly, the requestor device may evaluate a version identifier in a received response as compared to that of a previously received response to determine whether the response is associated with a different version of data than that of the previously received response.

Thus, the device identifier enables subsequent requests to be routed to a server device that previously handled a request from the requestor device, based on a requestor-provided identifier, which reduces the likelihood that a server device having a different data version will process subsequent requests of the requestor device. Further, the version identifier enables server devices and/or requestor devices to identify data version changes, such that one or more actions may be taken. For example, a server device may provide an initial page of data rather than providing a requested subsequent page of data, thereby reducing instances where a requestor device may obtain incomplete, duplicate, or otherwise incorrect data. As another example, a requestor device may identify that the data that was previously requested from the data platform is no longer current, such that it may discard the previously requested data and begin requesting the updated data. For example, a received initial page of data may be used as a starting point for a new series of subsequent requests.

FIG. 1 illustrates an overview of an example system 100 in which aspects of the paginated data transfer techniques described herein may be implemented. As illustrated, system 100 comprises requestor device 102, gateway 104, server devices 106 and 108, and data source 110. Gateway 104, server devices 106 and 108, and data source 110 form data platform 112, from which data may be accessed by requestor device 102 according to aspects described herein. For example, data platform 112 may provide an API (e.g., using request processor 118 and request processor 122 of server devices 106 and 108, respectively) with which requestor device 102 may access data. While data platform 112 is illustrated as comprising one gateway 104, two server devices 106 and 108, and one data source 110, it will be appreciated that any number of such elements may be used in other examples. Similarly, any number of requestor devices may be used.

Requestor device 102, gateway 104, server device 106, server device 108, and/or data source 110 may communicate using a network, which may comprise a local area network, a wireless network, or the Internet, or any combination thereof, among other examples. In examples, requestor device 102 and data platform 112 may communicate using a private network, such that data platform 112 is not publicly accessible.

As another example, certain request routing aspects of data platform 112 may not be available to devices outside of such a private network (e.g., devices that access data platform 112 via the Internet or other outside of an intranet with which data platform 112 is associated). For example, request router 116 may not route requests according to a device identifier for such external requests. Thus, given aspects described herein may at least partially affect load balancing of request router 116, requestor device 102 may be referred to as a trusted device, where requestor device 102 is unlikely to exhibit behavior that would be detrimental to data platform 112.

Further, while requestor device 102 is illustrated as being external to data platform 112, it will be appreciated that requestor device 102 may be any of a variety of devices. For example, the instant techniques may be used to facilitate data retrieval within a data center or data retrieval by a client device (e.g., associated with an end user), among other examples. As such, data platform 112 need not be a standalone data platform but may be part of any of a variety of computing scenarios, such as a cloud computing environment, a data center, or a content distribution network.

In examples, data from data source 110 is used by server devices 106 and 108 to process requests (e.g., as may be received from requestor device 102). For example, server device 106 may store data from data source 110 in data store 120, while server device 108 may store data from data source 110 in data store 124. As noted above, the instant techniques are applicable in any of a variety of contexts, such that data source 110 may generate or otherwise provide any of a variety of data, including, but not limited to, textual data, image data, video data, audio data, binary data, or any combination thereof.

Gateway 104 comprises request router 116, which routes requests from requestor device 102 to server device 106 or server device 108 for processing. For example, request router 116 may route requests according to utilization or a round robin algorithm, among other examples. In instances where a request comprises a device identifier, request router 116 may route the request according to the device identifier as discussed in greater detail below.

Server devices 106 and 108 may periodically update data stores 120 and 124 from data source 110, for example according to a schedule or in response to an indication from data source 110, among other examples. However, server devices 106 and 108 may not update data stores 120 and 124 at the same time, such that a request processed by server device 106 may yield a different response than a request processed by server device 108. Further, data in data store 120 and/or data store 124 may be updated between requests from requestor device 102, such that a first set of responses received by requestor device 102 is based on different data than a second set of responses even when the requests are handled by the same server device.

According to aspects described herein, request processor 118 and request processor 122 may each include a version identifier when responding to requests. Example version identifiers include, but are not limited to, a timestamp, an integer, or an identifier having a first subpart that is a major version identifier and a second subpart that is a minor version identifier, among other examples. In some instances, data source 110 may generate or otherwise specify a version identifier, such that data from data source 110 is stored in data store 120 and data store 124 in association with a version identifier provided by data source 110.

As another example, request processor 118 and request processor 122 may include a device identifier when responding to requests. For instance, server device 106 and server device 108 may each have an associated hostname, such that the hostname may be included as a device identifier. Other example device identifiers include, but are not limited to, an Internet protocol (IP) address or a globally unique identifier (GUID). In some instances, gateway 104 may store a table that maps device identifiers to server devices 106 and 108, such that request router 116 may use the table to route requests having a device identifier accordingly. It will be appreciated that, in other examples, request router 116 may resolve a device identifier to a device using any of a variety of other techniques. For example, if a hostname is used as a device identifier, request router 116 may communicate with a domain name system (DNS) server to determine the server device associated with the device identifier.

In examples, data requestor 114, request processor 118, and request processor 122 may include a version identifier and a device identifier as headers of associated requests and responses as described herein. In other examples, such information may be provided as part of a uniform resource locator (URL) that is used to make an API call or as another part of a response (e.g., a body or a footer). Thus, it will be appreciated that data requestor 114 may use any of a variety of techniques to provide device and/or version identifiers to server devices 106 and/or 108, and vice versa.

Data requestor 114 of requestor device 102 may request a subset of data from data platform 112 according to aspects described here. For example, data requestor 114 generates an initial request for data, which is routed by request router 116 to server device 106 or server device 108. For the purpose of the current example, the request may be routed to server device 106. The request may be processed by server device 106 (e.g., by request processor 118), and a response may be received comprising a device identifier associated with server device 106 and a version identifier (e.g., as may have been generated by data source 110), as described above. The response may comprise an initial page of data, where one or more subsequent pages of data are yet to be retrieved from data platform 112.

Accordingly, data requestor 114 may generate a subsequent request for a subsequent subset of data. The subsequent request may include the device identifier and the version identifier that were received in response to the initial request. Accordingly, request router 116 may route the request according to the device identifier, such that the request may be routed to server device 106.

In some instances, request router 116 may not route the request according to the device identifier, as may be the case when the associated server device is offline or is otherwise inaccessible. As another example, request router 116 may not adhere to an indicated device identifier in instances where the associated server device exhibits utilization above a predetermined threshold or when requestor device 102 has issued a number of requests that exceeds a predetermined threshold for a given time period. Such conditions are referred to herein as non-routing conditions. Thus, it will be appreciated that a device identifier may indicate a preference for a server device and need not be honored or followed by request router 116, for example as the result of an identified non-routing condition. In instances where request router 116 does not route a request according to a device identifier, the request may be routed as though no device identifier was present.

Returning to the above example, request processor 118 may evaluate the version identifier of the request as compared to a version identifier associated with the data in data store 120. If the request version identifier matches the data version identifier of data store 120, request processor 118 may process the request and return a subsequent page of data accordingly. However, if the request version identifier does not match the data version identifier (e.g., it is higher, lower, or different), request processor 118 may instead return an initial page of data. The response generated by request processor 118 similarly includes the device identifier for server device 106 and the version identifier for the data in data store 120.

Accordingly, data requestor 114 may evaluate the received version identifier. If the received version identifier does not match that of the subsequent request, data requestor 114 may determine that the data has since changed. As a result, data requestor 114 may discard previously received data from data platform 112 (as the previously requested data is incomplete). Data requestor 114 may store the received subset of data as an initial page of data and may restart requesting data from data platform 112, such that the next request issued by data requestor 114 is for a subsequent subset of data according to the updated version identifier.

Figure 2A:
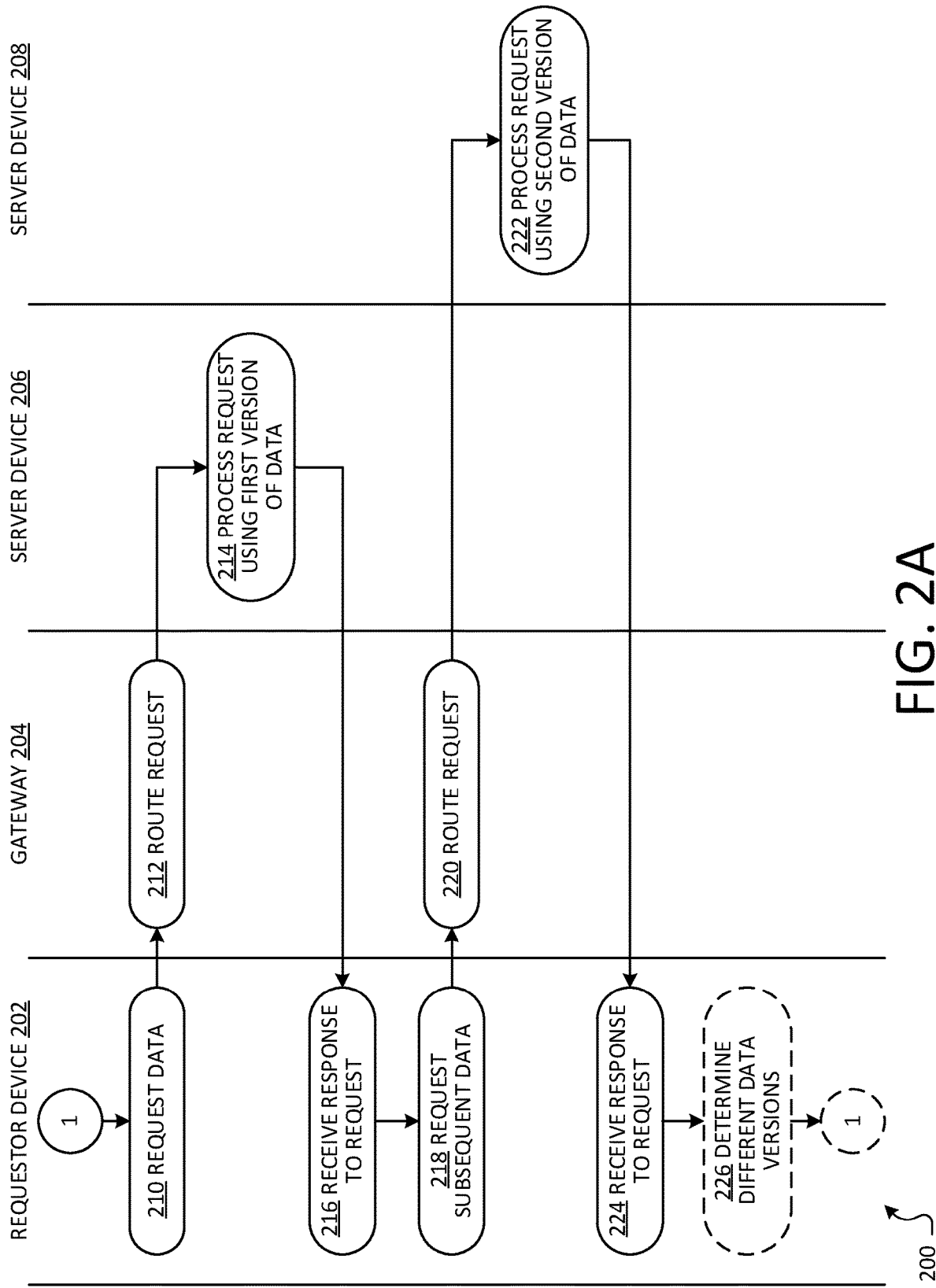
FIG. 2A illustrates an overview of an example process flow according to other techniques, the issues of which are addressed by the paginated data transfer techniques described herein.

FIG. 2A illustrates an overview of an example process flow 200 according to other techniques, issues of which are addressed by the paginated data transfer techniques described herein. For example, flow 200 may not include the use of a device identifier and a version identifier, such that requestor device 202 is unable to indicate a preference to continue communication with the same server device and cannot easily identify a changed data version.

As illustrated, flow 200 occurs among requestor device 202, gateway 204, server device 206, and server device 208, aspects of which are similar to requestor device 102, gateway 104, server device 106, and server device 108, respectively, and are therefore not necessarily re-described below in detail.

Flow 200 begins at operation 210, where requestor device 202 requests data. Gateway 204 routes the request at operation 212, for example according to utilization of server devices 206 and 208 or using a round robin algorithm, among other examples. In the instant example, gateway 204 routes the request to server device 206, where the request is processed using a first version of the data at operation 214. Requestor device 202 receives a response to its request at operation 216, after which it requests subsequent data at operation 218.

Similar to the initial request at operation 210, gateway 204 routes the request at operation 220, this time routing the request to server device 208. Server device 208 processes the request using a second version of the data at operation 222, such that a response is received by requestor device 202 at operation 224. Thus, requestor device 202 receives two responses, each of which were generated using different versions of data (e.g., at operations 216 and 224). However, absent the aspects described herein, requestor device 202 may be unable to determine that different versions were used, much less indicate a preference to continue communicating with server device 206 rather than server device 208.

Further, even if requestor device 202 were able to determine different versions of the data were used, as illustrated by operation 226, requestor device 202 may loop between operations 210-226 as a result of the inability to specify a preference for the server device to which its requests are routed. For example, one or more pages may be retrieved from server device 206 until a page of data was received from server device 208 instead, at which point requestor device 202 may start over with server device 208 (e.g., which has a different data version), and vice versa. Thus, aspects described herein resolve such potential inefficiencies, among other benefits.

Figure 2B:
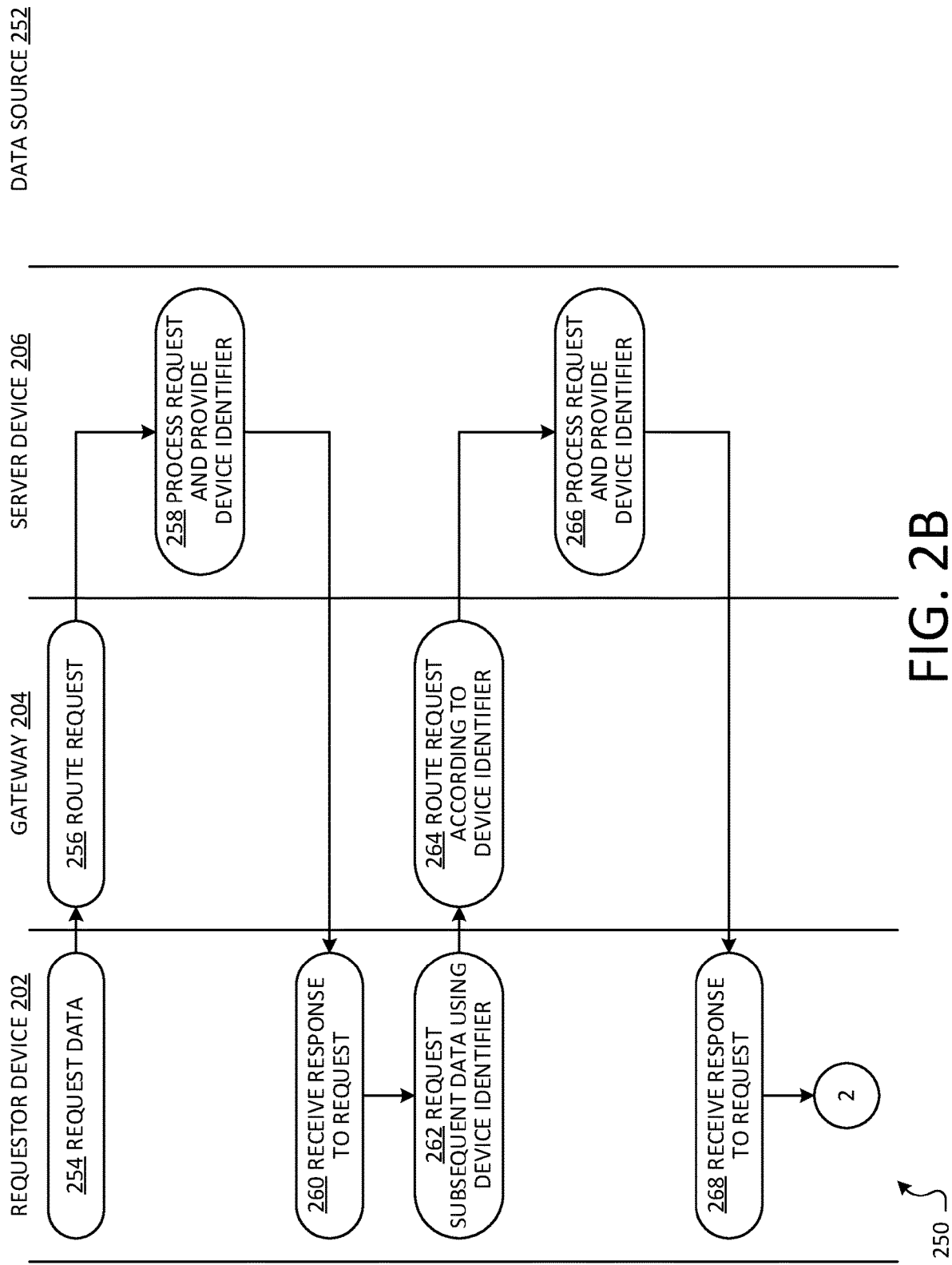
FIGS. 2B-2C illustrate an overview of example process flows according to the paginated data transfer techniques described herein.
Figure 2C:
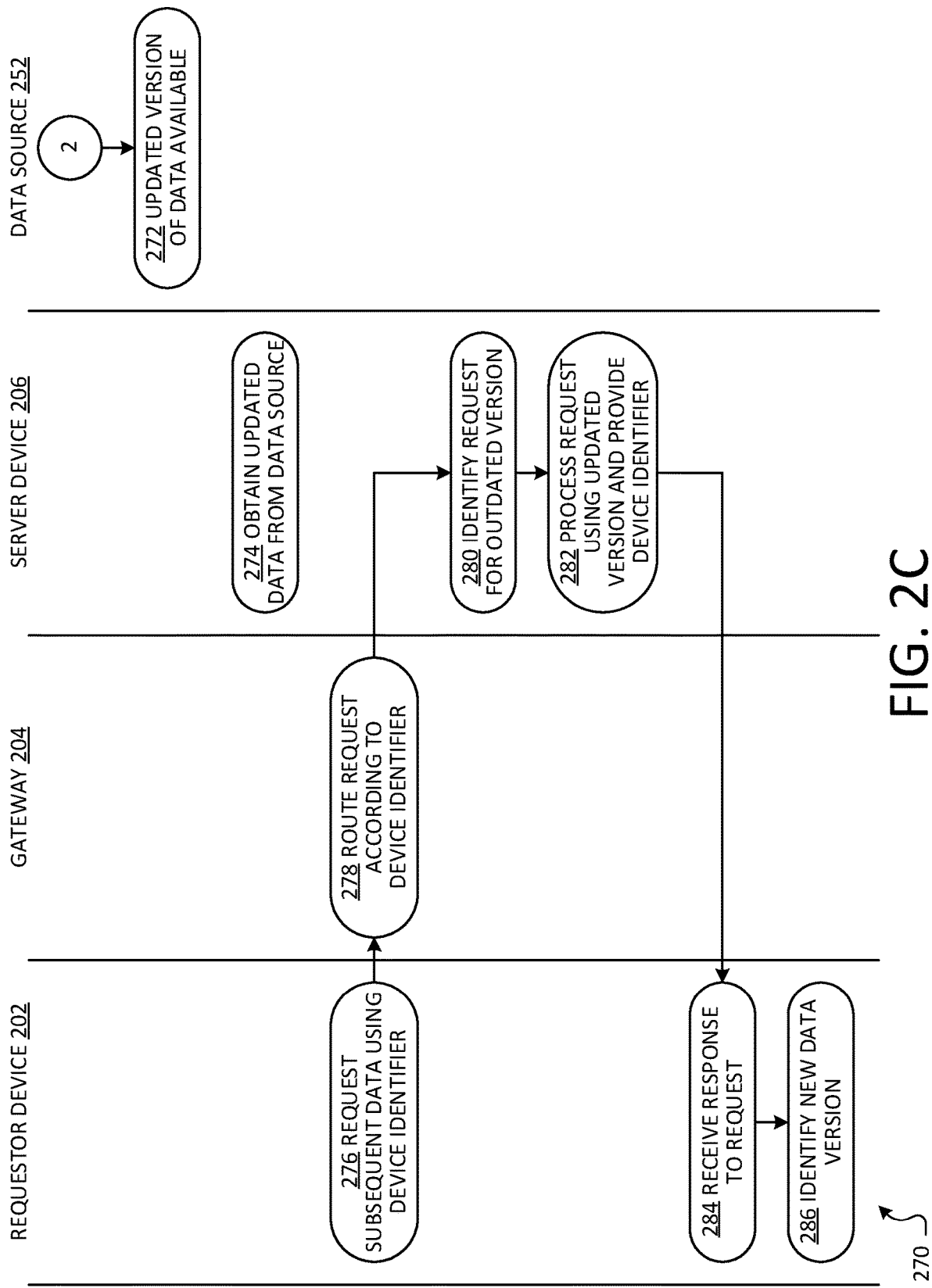

FIGS. 2B-2C illustrate an overview of example process flows 250 and 270 according to the paginated data transfer techniques described herein. As illustrated, process flows 250 and 270 occur among requestor device 202, gateway 204, server device 206, and data source 252, aspects of which are similar to requestor device 102, gateway 104, server device 106, and data source 110, respectively, and are therefore not necessarily re-described below in detail.

Flow 250 begins at operation 254, where an initial subset of data is requested from a data platform (e.g., data platform 112 discussed above with respect to FIG. 1). Accordingly, at operation 256, gateway 204 routes the request to server device 206. Given the request does not comprise a device identifier, gateway 204 may route the request according a variety of techniques, as described above.

Server device 206 processes the request at operation 258. For example, server device 206 may access data from a data store, where the data store comprises data from data source 252. Server device 206 generates a response to the request that includes a device identifier associated with server device 206, which is received by requestor device 202. In examples, the response further comprises a version identifier associated with the data used to process the request, as may have been generated by data source 252.

At operation 262, requestor device 202 requests a subsequent subset of data using the device identifier that was received from server device 206. Accordingly, gateway 204 routes the request according to the device identifier at operation 264. Thus, as compared to operation 256, where the request may have been routed to any of a variety of server devices of the data platform (e.g., server device 208 discussed above with respect to FIG. 2A), gateway 204 may route the request according to a device preference indicated by requestor device 202.

The request is processed by server device 206 at operation 266, such that a response is received by requestor device 202 at operation 268. Such aspects are similar to those of operations 258 and 260 discussed above and are therefore not necessarily re-described in detail.

Flow continues in FIG. 2C, where an updated version of the data of data source 252 is available at operation 272. For example, data source 252 may generate new or updated data according to a schedule and/or in response to an event, among other examples. Accordingly, server device 206 obtains updated data from data source 252 at operation 274. For example, server device 206 may periodically check the version of data that is available from data source 252, such that server device 206 obtains updated data from data source 252 when it is available. As another example, server device 206 may receive an indication from data source 252, in response to which the updated data may be obtained. As described above, the updated data may be associated with a version identifier, such as a timestamp or an integer.

As illustrated, requestor device 202 requests a subsequent subset of data using the device identifier at operation 276. Gateway 204 again routes the request according to the device identifier at operation 278, at which point server device 206 identifies a request for an outdated version at operation 280. For example, the request from requestor device 202 may include a version identifier that was previously received by requestor device 202 from server device 206 (e.g., as part of operations 258 and/or 266). It may be determined that the request is for an outdated version based on the received version identifier being lower than the version identifier that was obtained at operation 274. For example, if timestamps are used as version identifiers, it may be determined that the received version identifier is an older timestamp than that which was obtained from data source 252 at operation 274. While example version identifiers and comparison techniques are described herein, it will be appreciated that any of a variety of alternative version identifiers and associated comparison techniques may be used according to aspects of the present disclosure.

As a result, server device 206 processes the request using the updated version of the data that was obtained at operation 274 and treats the request as a request for an initial page of data. The request is provided with the device identifier of server device 206 and the version identifier of the updated data.

Requestor device 202 receives the response at operation 284 and, at operation 286, is able to determine that an updated version of the data was used to generate the response. As a result, requestor device 202 may discard data that was previously received from server device 206 and may restart requesting data. For example, the data that was received at operation 284 may be used as an initial page of data, as the received data is similar to that which would have been received in response to an initial request (e.g., similar to operation 260) by requestor device 202.

Thus, as compared to process flow 200 in FIG. 2A, requestor device 202 is able to continue requesting data from server device 206 regardless of whether another server device (e.g., server device 208) has a different data version. Further, when the data version of server device 206 changed, requestor device 202 was able to identify the change rather than potentially receiving incomplete data, duplicate data, or otherwise incorrect data from server device 206.

Figure 3:
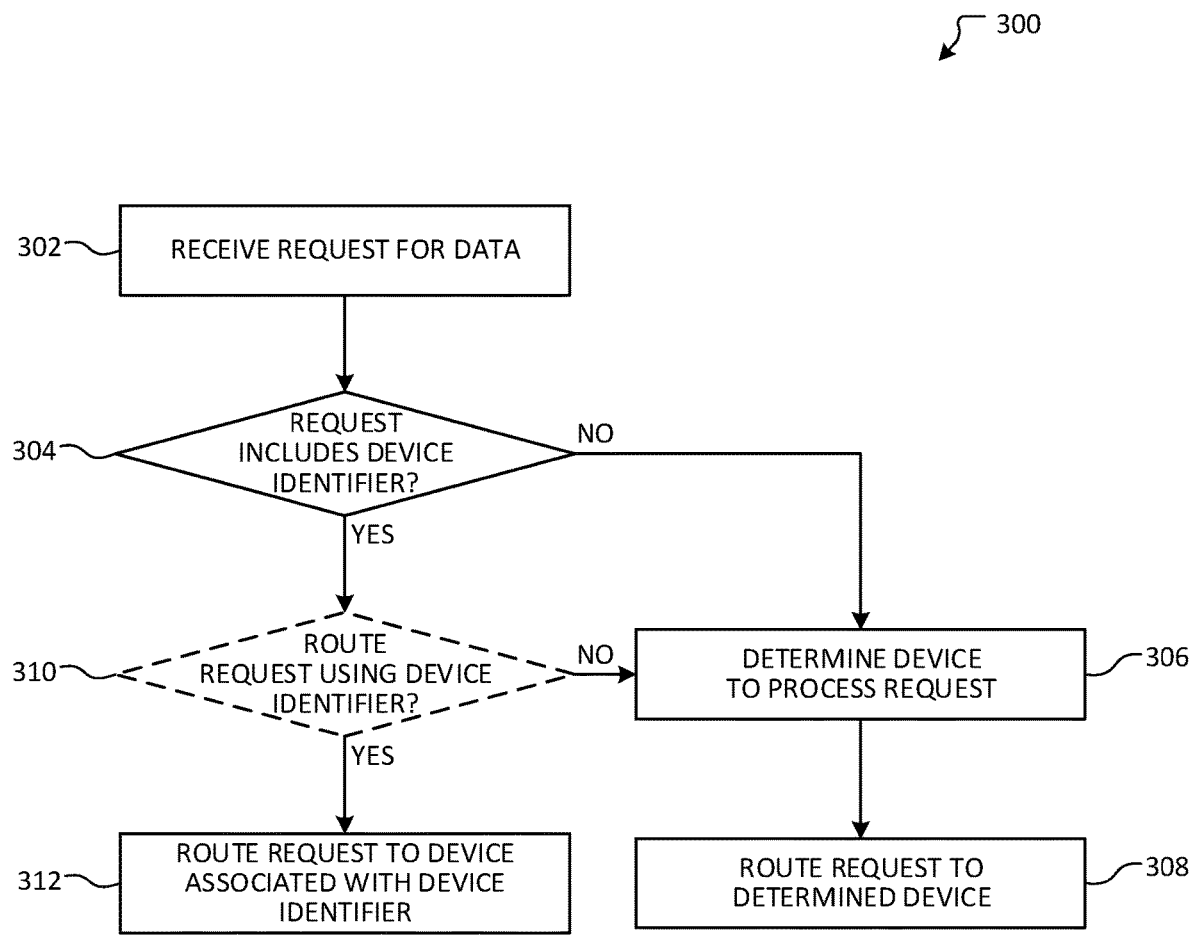
FIG. 3 illustrates an overview of an example method for routing a request for data by a gateway according to the paginated data transfer techniques described herein.

FIG. 3 illustrates an overview of an example method 300 for routing a request for data by a gateway according to the paginated data transfer techniques described herein. For example, aspects of method 300 may be performed by a request router, such as request router 116 of gateway 104 discussed above with respect to FIG. 1.

Method 300 begins at operation 302, where a request for data is received. The request may be received from a requestor device, such as requestor device 102 or requestor device 202 discussed above with respect to FIGS. 1 and 2A-2C, respectively.

At operation 304, it is determined whether the request comprises a device identifier. In instances where the received request is a subsequent request for data (e.g., as discussed above with respect to operations 262 and 276 in FIGS. 2B-2C), the request may include a device identifier that was previously received by the requestor device from a server device of a data platform. By contrast, if the received request is an initial request for data (e.g., as discussed above with respect to operation 254 in FIG. 2B), the request may not include a device identifier. For example, a device identifier may be included as a header of the request.

Accordingly, if it is determined that the request does not include a device identifier, flow branches "NO" to operation 306, where a server device is determined with which to process the request. For example, the device may be determined from a set of server devices associated with a data platform. The server device may be determined based on utilization of the server devices, where a server device having the lowest utilization is determined to process the request. As another example, a round robin algorithm may be used. Thus, it will be appreciated that any of a variety of techniques may be used to determine a server device with which to process the request.

Flow progresses to operation 308, where the request is routed to the determined server device, such that the server device may process the request accordingly. In some instances, routing the request to the server device may comprise providing an indication of the request and the requestor device to the server device, such that the server device may respond to the requestor device accordingly. As another example, a response may be received from the server device (e.g., by the gateway), which may then be relayed back to the requestor device. As such, any of a variety of techniques may be used to route requests to a server device by a gateway according to aspects described herein. Flow terminates at operation 308.

If, however, the request includes a device identifier, flow instead branches "YES" to determination 310, where it is determined whether to route the request using the device identifier. For example, determination 310 may comprise determining the presence of one or more non-routing conditions, such as whether the server device associated with the device identifier is offline or otherwise inaccessible. As another example non-routing condition, a utilization of the server device may be evaluated with respect to a predetermined threshold, such that utilization above the predetermined threshold may be determined to indicate that the server device is unavailable. In a further example non-routing condition, it may be determined that the requestor device from which the request was received at operation 302 has issued a number of requests that exceeds a predetermined threshold for a given time period, such that the device identifier will not be used to route the request. Any of a variety of additional or alternative non-routing conditions may be used.

Determination 310 is illustrated using a dashed line to indicate that, in other examples, the determination may be omitted. For example, the request may be routed according to the device identifier regardless of such a non-routing conditions, such that server state information associated with server devices need not be maintained and/or used for routing requests.

If it is determined to not route the request using the device identifier, flow branches "NO" to operations 306 and 308, which were described above. However, if it is determined to route the request using the device identifier, flow instead branches "YES" to operation 312, where the request is routed to the device associated with the device identifier. As noted above, any of a variety of techniques may be used to resolve a device identifier to a server device with which to process the request, such as a table of device identifiers and associated devices, or via DNS resolution, among other examples. Method 300 terminates at operation 312.

Figure 4:
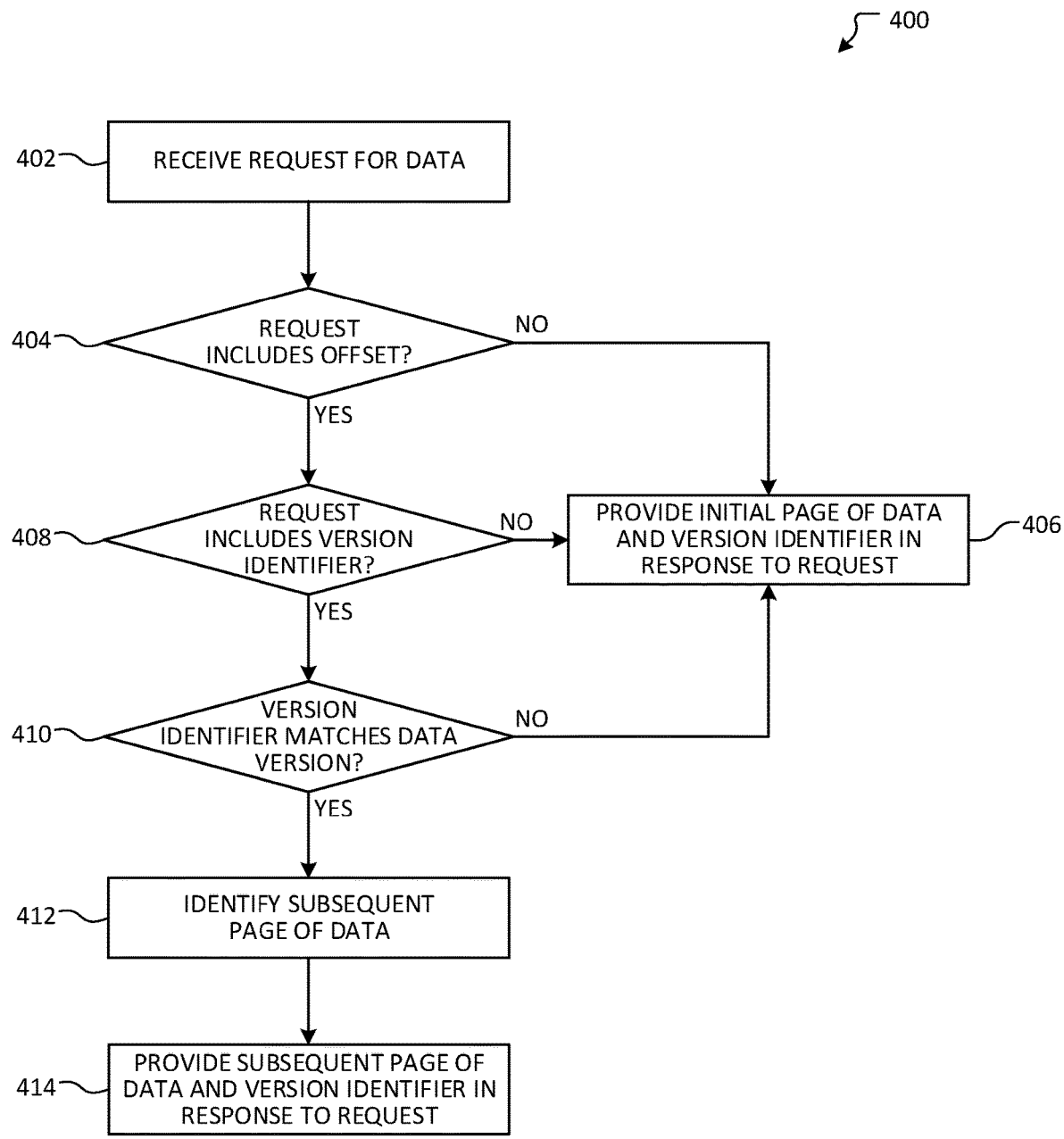
FIG. 4 illustrates an overview of an example method for processing a request by a server device according to the paginated data transfer techniques described herein.

FIG. 4 illustrates an overview of an example method 400 for processing a request by a server device according to the paginated data transfer techniques described herein. In examples, aspects of method 400 are performed by a request processor of a server device, such as request processor 118 or request processor 122 of server device 106 and server device 108, respectively.

Method 400 begins at operation 402, where a request for data is received. The request may be from a requestor device, such as requestor device 102 or requestor device 202 discussed above with respect to FIGS. 1 and 2A-2C, respectively. The request may have been routed by a gateway, such as gateway 104 or gateway 204, discussed above with respect to FIGS. 1 and 2A-2C, respectively.

At determination 404, it is determined whether the request includes an offset. As described above, a requestor device may provide an offset to request a subsequent page of data. By contrast, if no offset is specified and the request is an initial request for data (e.g., as discussed above with respect to operation 254 in FIG. 2B), the data platform may instead return an initial page of data. Thus, if it is determined at determination 404 to that the request does not include an offset, flow branches "NO" to operation 406, which is described below.

However, if it is determined that the request includes an offset, flow instead branches "YES" to determination 408, where it is determined whether the request includes a version identifier. In instances where the received request is a subsequent request for data (e.g., as discussed above with respect to operations 262 and 276 in FIGS. 2B-2C), the request may, in some cases, include a version identifier that was previously received by the requestor device from a server device of a data platform (e.g., as a result of performing aspects of operation 406 or 414, discussed below). For example, a version identifier may be included as a header of the request. Accordingly, if it is determined that the request does not include a version identifier, flow branches "NO" to operation 406, which is described below.

However, if the request includes a version identifier, flow instead branches "YES" from determination 408 to determination 410, where it is determined whether the version identifier of the received request matches the data version identifier. In examples, a match may be an exact match. In other instances, a received version identifier that is less than the data version identifier may be determined to not be a match. In some instances, identifying a matching version identifier may comprise comparing subparts of the version identifiers. For example, a matching major version number may constitute a match at determination 410, while a mismatched minor version identifier may not cause determination 410 to conclude that the version identifiers are mismatched. As another example, a received minor version identifier that is less than a data minor version identifier may be determined to be a mismatch. Thus, it will be appreciated that any of a variety of techniques may be used to determine whether the received version identifier matches the data version identifier.

If it is determined that the received version identifier does not match the data version identifier, flow branches "NO" to operation 406, where an initial page of data is provided in response to the request. In examples, the response comprises a version identifier and a device identifier according to aspects described herein. The version identifier may be associated with the data that was used to generate the response to the request, as may have been generated by or otherwise received from a data source (e.g., data source 110 or data source 252 discussed above with respect to FIGS. 1 and 2B-2C, respectively).

In other examples, operation 406 may comprise providing an error in addition to or as an alternative to an initial page of data. For example, an error may be provided in instances where it is determined that an included version identifier does not match a data version identifier to indicate a version mismatch (e.g., operation 406 is performed as a result of branching "YES" at operation 408 and "NO" at determination 410). As another example, an error may be provided in instances where an offset was included in the request but the request did not include a version identifier to indicate a failure to conform to a protocol (e.g., operation 406 is performed as a result of branching "YES" at determination 404 and "NO" at determination 408). It will be appreciated that such aspects are provided as an example and, in other examples, a requested subsequent page may be provided based on an included offset (e.g., according to operations 412-414 below), even if the request does not include a version identifier (e.g., flow may instead branch "NO" from determination 408 to operation 412). In such examples, the response may include a data version identifier, such that the requestor device may validate the version identifier included with the subsequent page of data. Flow terminates at operation 406. Thus, in instances where a version identifier is not received or a received version identifier does not match the data version identifier, an initial page of data may be provided at operation 406.

By contrast, if it is determined that the received version identifier matches the data version identifier, flow instead branches "YES" to operation 412, where a subsequent page of data is identified. For example, the subsequent page of data may be identified based on an offset included in the received request. As described above, the subsequent page of data may comprise a number of records up to a count, as may be a data platform default or specified in the request received at operation 402. Thus, if the request includes a count, a data platform default may be overridden. In instances where a count is not provided as part of the request, a default count may be associated with a type of request, such that different counts may be used for different requests. In a further example, the request received at operation 402 may be required to include a count of records requested in response, such that an error may be generated in response to a request that omits such a count.

At operation 414, the subsequent page of data is provided in response to the request. The response may further comprise the data version identifier and a device identifier as described above. Method 400 terminates at operation 414.

Figure 5:
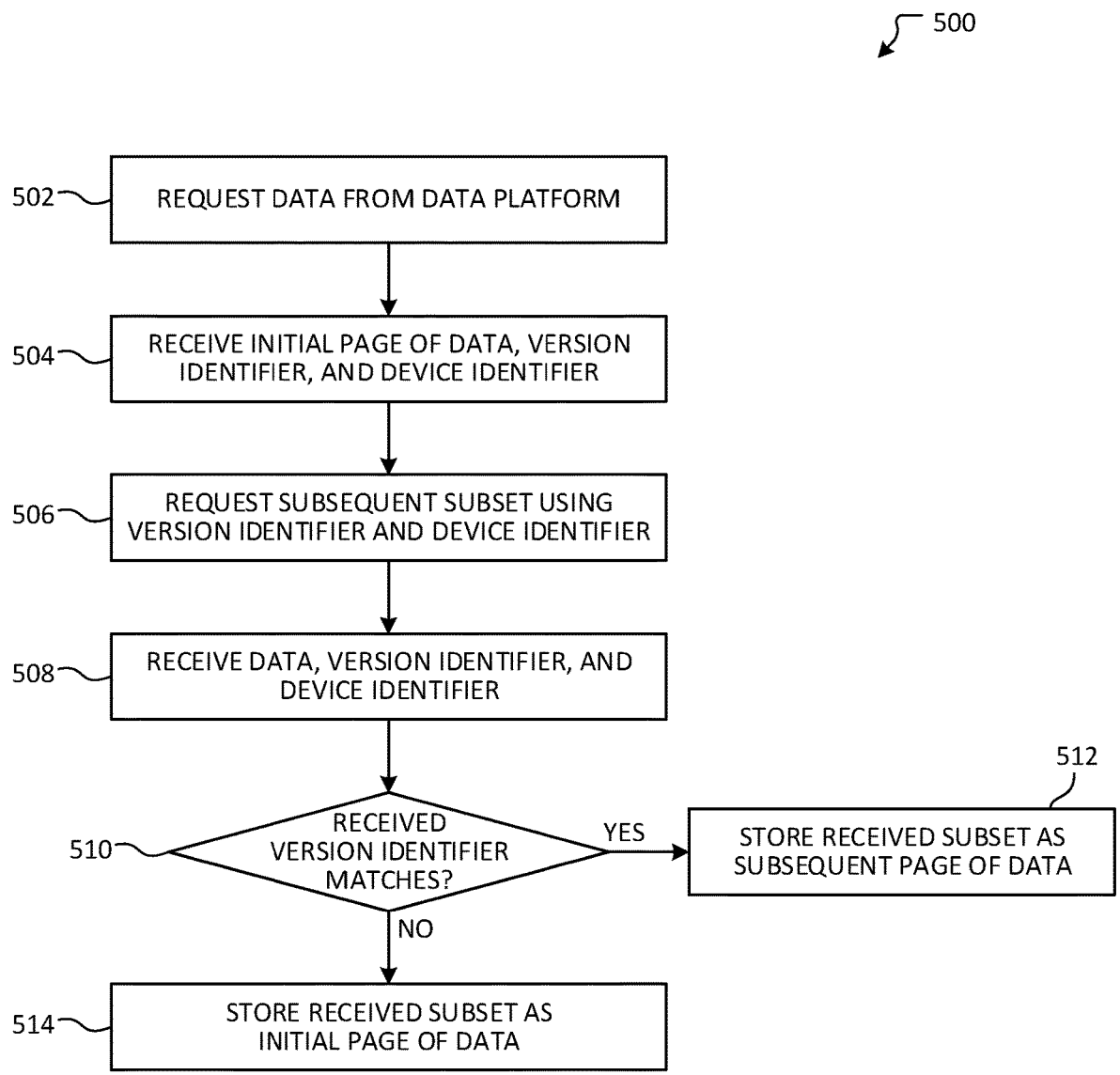
FIG. 5 illustrates an overview of an example method for requesting data from a data platform according to the paginated data transfer techniques described herein.

FIG. 5 illustrates an overview of an example method 500 for requesting data from a data platform according to the paginated data transfer techniques described herein. In examples, aspects of method 500 are performed by a requestor device, such as requestor device 102 or requestor device 202 discussed above with respect to FIGS. 1 and 2A-2C, respectively.

Method 500 begins at operation 502, where data is requested from a data platform. For example, the data may be requested from data platform 112 discussed above with respect to FIG. 1. The request may be similar to the request in operation 210 or operation 254 discussed above with respect to FIGS. 2A and 2B, respectively. For example, the request at operation 502 may be an API call using a RESTful API of the data platform.

At operation 504, a response comprising an initial page of data, a version identifier, and a device identifier is received. The response may have been generated by a server device performing aspects of operation 406, as was discussed above with respect to method 400 of FIG. 4. The identifiers may be included in a header of the response, among other examples.

Flow progresses to operation 506, where subsequent data is requested from the data platform using the version identifier and the device identifier that were received at operation 504. In examples, the request further comprises an indication as to the subsequent subset of data that is being requested, for example using an offset and/or a count of records being requested, among other examples.

Moving to operation 508, a response is received from the data platform in response to the request that was generated at operation 506. The response comprises a subsequent subset of data, a version identifier, and a device identifier. For example, the response may have been generated by a server device performing aspects of operation 414, as was discussed above with respect to method 400 of FIG. 4.

At determination 510, it is determined whether the version identifier received at operation 508 matches the version identifier that was received at operation 504. For example, in instances where the request was processed by the same server device and the data was unchanged, the version identifiers may match. Such aspects are similar to those discussed above with respect to operations 254-268 in FIG. 2B. However, if a different server device processed the subsequent request generated at operation 506 and the different server device had a different data version (e.g., similar to that of operations 210-224 discussed above with respect to FIG. 2A), or data at the same server device was updated between the initial request and the subsequent request (e.g., similar to that of operations 272-284 in FIG. 2C), the version identifiers may not match.

Accordingly, if it is determined that the version identifiers match, flow branches "YES" to operation 512, where the received subsequent subset of data is stored as a subsequent page of data (e.g., in addition to the initial data that was received at operation 504). If, however, it is determined that the version identifiers do not match, flow instead branches "NO" to operation 514, where the received subset of data is stored as an initial page of data (e.g., similar to that of operation 504). While method 500 is described in an instance where the data received from the data platform is stored, such as to ensure a locally available copy of the data exists, it will be appreciated that the data may be used in any of a variety of alternative or additional ways, for example for processing by the requestor device, for presentation to a user of the requestor device, or for transmission to another computing device. Method 500 terminates at either operation 512 or operation 514.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
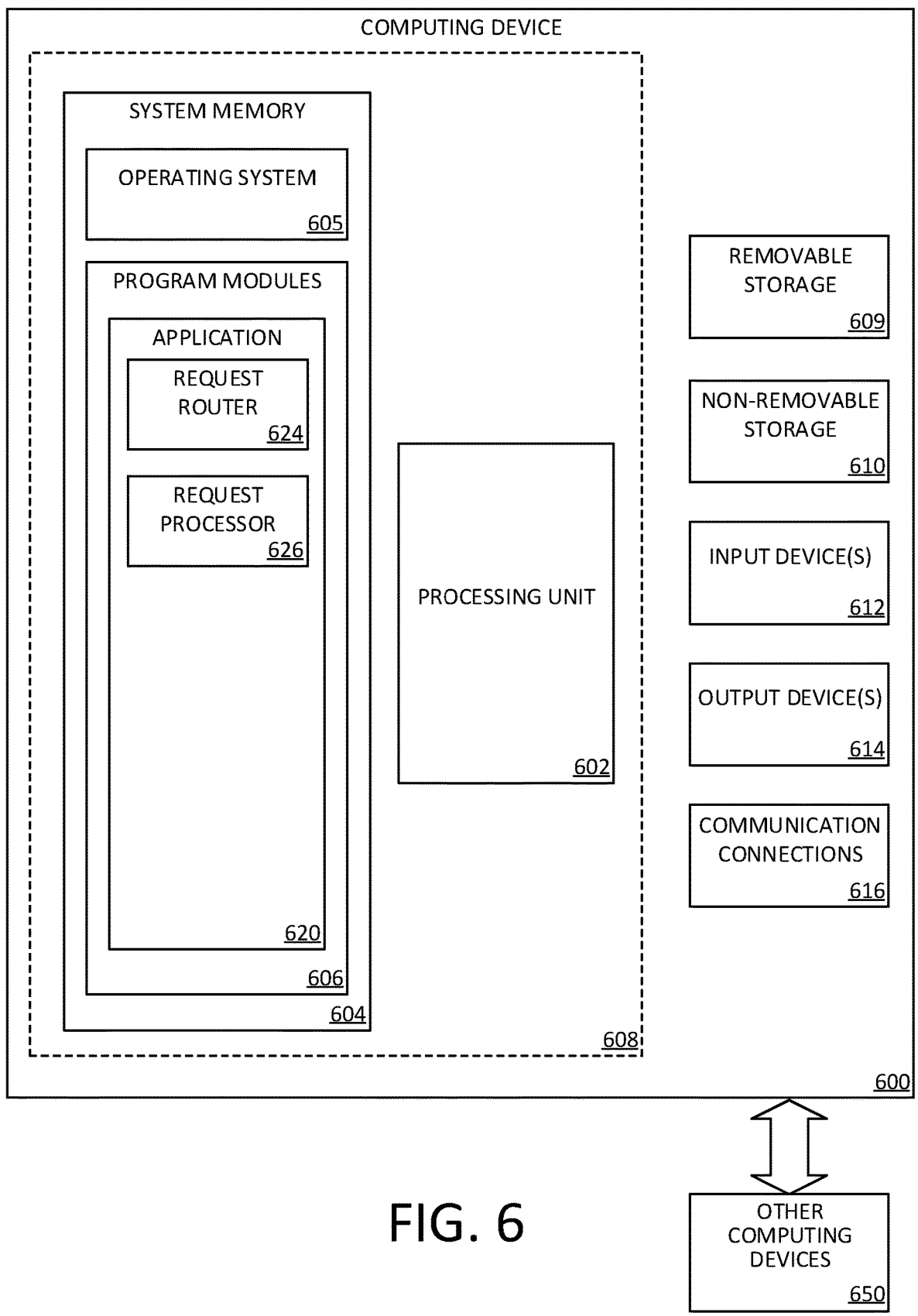
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including devices 102, 104, 106, 108, and 110 in FIG. 1 and devices 202, 204, 206, 208, and 252 in FIGS. 2A-2C. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context determination engine 624 and input processor 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
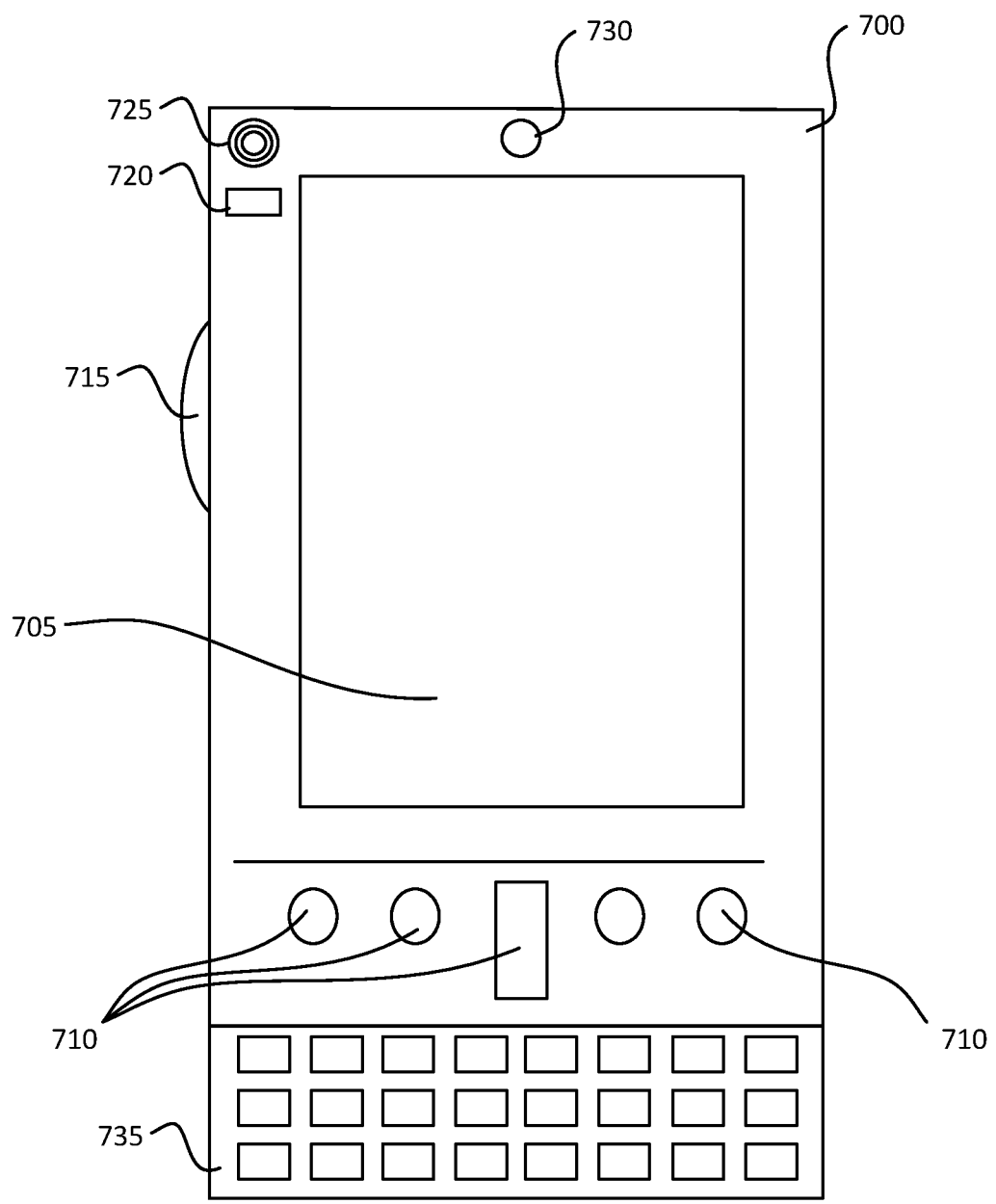
FIGS. 7A and 7B are simplified block diagrams of a mobile computing device with which aspects of the present disclosure may be practiced.
Figure 7B:
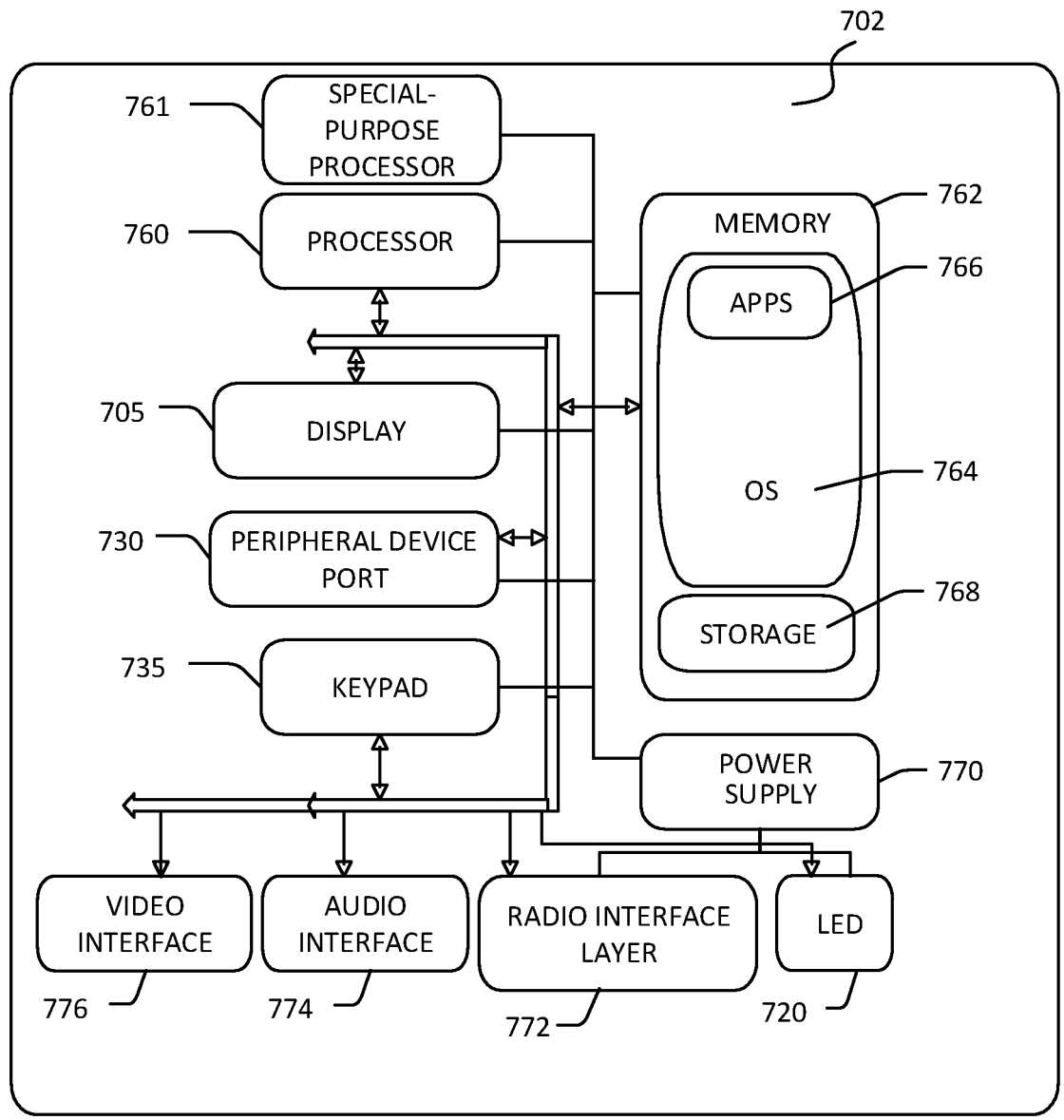

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
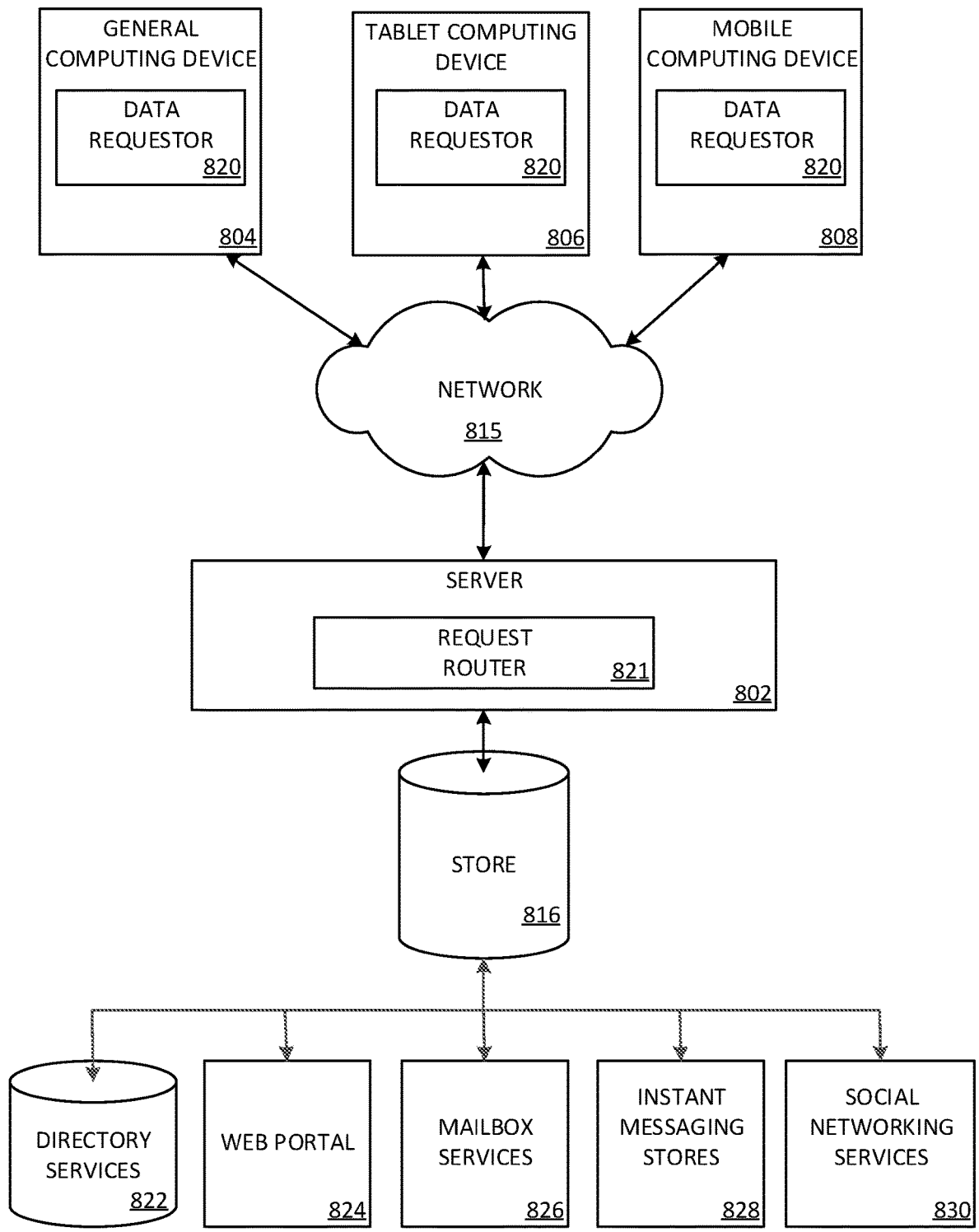
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A request processor 820 may be employed by a client that communicates with server device 802, and/or request router 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
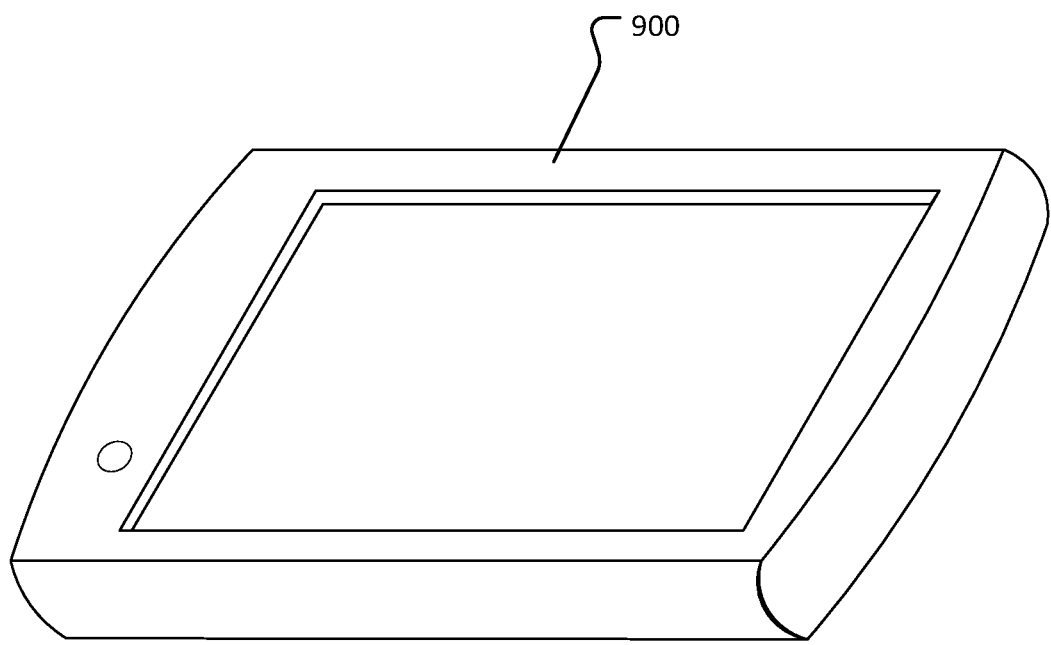
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: at least one processor; and memory storing instructions that, when executed by the at least one processor, causes the system to perform a set of operations. The set of operations comprises: generating a first request for an initial subset of data from a data platform; receiving, from the data platform in response to the first request, a first response comprising a first device identifier and a first data version identifier; generating a second request for a first subsequent subset of data from the data platform including the first device identifier; receiving, from the data platform in response to the second request, a second response comprising a second device identifier and a second data version identifier; when the first data version identifier and the second data version identifier are the same, generating a third request for a second subsequent subset of data from the data platform; and when the first data version identifier and the second data version identifier are not the same, generating a fourth request for a third subsequent subset of data from the data platform. In an example, the second response includes the first subsequent subset of data from the data platform when the first data version identifier and the second data version identifier are the same. In another example, the initial subset of data is a first initial subset of data; and the second response in response to the second request includes a second initial subset of data from the data platform when the first data version identifier and the second data version identifier are not the same. In a further example, the second request comprises an indication of a second page of the data. In yet another example, the first response comprises the initial subset of data; and the set of operations further comprises discarding the initial subset of data when the first data version identifier and the second data version identifier are not the same. In a further still example, the initial subset of data is associated with a first page of the data; the first subsequent subset of data is associated with a second page of the data; and the second subsequent subset of data is associated with a third page of the data. In an example, the second request comprises an indication of the second page and the third request comprises an indication of the third page. In a further example, the second initial subset of data is associated with a first page of the data; and the third subsequent subset of data is associated with a second page of the data. In yet another example, the second initial subset of data is associated with a first page of the data; and the third subsequent subset of data is associated with a second page of the data.

In another aspect, the technology relates to a method for processing a request for data of a data platform. The method comprises: receiving, from a requestor device, a first request for data of the data platform; processing the request using data of a data source, wherein the data has an associated first version identifier; providing, to the requestor device, a first response comprising an initial page of data and the first version identifier; receiving, from the requestor device, a second request for data of the data platform, wherein the second request includes a second version identifier and a first subsequent page indication; and based on determining the first version identifier and the second version identifier are the same, providing, to the requestor device, a second response comprising a first subsequent page of data based on the first subsequent page indication. In an example, the method further comprises: obtaining, from the data source, an updated version of the data associated with a third version identifier; receiving, from the requestor device, a third request for data of the data platform, wherein the third request includes the second version identifier and a second subsequent page indication; and based on determining the second version identifier and the third version identifier are not the same, providing, to the requestor device, a third response comprising the third version identifier. In another example, the initial page of data is a first initial page based on an earlier version of the updated version of the data; and the third response comprises a second initial page of data based on the updated version of the data. In a further example, the subsequent page indication is an offset and the first subsequent page of data comprises data after the offset. In yet another example, the second request further comprises an indication of a count of records and the first subsequent page of data comprises a number of records after the offset up to the count of records. In a further still example, the first response further comprises a device identifier and the second response further comprises the device identifier.

In a further aspect, the technology relates to a method for routing requests for data of a data platform. The method comprises: receiving, from a first requestor device, a first request for data; based on determining the first request comprises a first device indication, routing the request to a first server device based on the first device indication; receiving, from a second requestor device, a second request for data; and based on determining the second request does not comprise a second server device indication: identifying a second server device from a set of server devices of the data platform; and routing the second request to the second server device. In an example, routing the request to the first server device based on the first device indication comprises identifying the first server device based on an association between the first server device and the first device indication. In another example, the method further comprises: receiving, from the second requestor device, a third request for data comprising a third device indication associated with the second server device; and based on determining the third request comprises the third device indication, routing the third request to the second server device. In a further example, the method further comprises: receiving, from the second requestor device, a third request for data comprising a third device indication associated with the second server device; and based on the third device indication corresponding to a non-routing condition: identifying a third server device from the set of server devices of the data platform; and routing the third request to the third server device. In yet another example, identifying the third server device from the set of server devices comprises identifying, as a result of the non-routing condition, a server device that is not the second server device from the set of server devices.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        sending, to a data platform, a first request for a first initial subset of data from a data platform;
        receiving, from the data platform in response to the first request, a first response comprising the first initial subset of data, a first device identifier, and a first data version identifier associated with the first initial subset of data, wherein the first initial subset of data is associated with a first set of data;
        sending, to the data platform, a second request for a first subset of data from the data platform including the first device identifier from the first response;
        receiving, from the data platform in response to the second request, a second response comprising a first subset of data, a second device identifier, and a second data version identifier associated with the first subset of data;
        determining, based on the first data version identifier and the second data version identifier, which of a third request or a fourth request to generate, the determining comprising:
            when the first data version identifier and the second data version identifier are the same:
                determining that the first subset of data is a first subsequent subset of data that is subsequent to the first initial data, such that the first subsequent subset of data is associated with the first set of data; and
                determining to generate a third request for a second subsequent subset of data from the data platform to obtain data subsequent to the first subsequent subset of data; and
            when the first data version identifier and the second data version identifier are not the same:
                determining that the first subset of data is a second initial subset of data, such that the second initial subset of data is associated with a second set of data different from the first set of data; and
                determining to generate a fourth request for a third subsequent subset of data from the data platform to obtain data subsequent to the second initial subset of data; and
        sending the determined one of the third request or the fourth request to the data platform.

2. The system of claim 1, wherein the second request comprises an indication of a second page of the first set of data.

3. The system of claim 1, wherein the set of operations further comprises discarding the first initial subset of data when the first data version identifier and the second data version identifier are not the same.

4. The system of claim 1, wherein:
    the first initial subset of data is associated with a first page of the data;
    the first subsequent subset of data is associated with a second page of the data; and
    the second subsequent subset of data is associated with a third page of the data.

5. The system of claim 4, wherein the second request comprises an indication of the second page and the third request comprises an indication of the third page.

6. The system of claim 1, wherein:
    the second initial subset of data is associated with a first page of the second set of data; and
    the third subsequent subset of data is associated with a second page of the second set of data.

7. The system of claim 1, wherein:
    the third request includes the first device identifier; and
    the fourth request includes the second device identifier.

8. A method for requesting data from a data platform, the method comprising:
- sending, to the data platform, a first request for a first initial subset of data from the data platform;
- receiving, from the data platform, a first response comprising the first initial subset of data, a first device identifier, and a first data version identifier associated with the first initial subset of data, wherein the first initial subset of data is associated with a first set of data;
- sending, to the data platform, a second request for a first subset of data including the first device identifier from the first response;
- receiving, from the data platform, a second response comprising a first subset of data, a second device identifier, and a second data version identifier associated with the first subset of data;
- determining, based on the first data version identifier and the second data version identifier, which of a third request or a first request to generate, the determining comprising:
  - when the first data version identifier and the second data version identifier are the same:
    - determining that the first subset of data is a first subsequent subset of data that is subsequent to the first initial data, such that the first subsequent subset of data is associated with the first set of data; and
    - determining to generate a third request for a second subsequent subset of data from the data platform to obtain data subsequent to the first subsequent subset of data; and
  - when the first data version identifier and the second data version identifier are not the same:
    - determining that the first subset of data is a second initial subset of data, such that the second initial subset of data is associated with a second set of data different from the first set of data; and
    - determining to generate a fourth request for a third subsequent subset of data from the data platform to obtain data subsequent to the second initial subset of data; and
- sending the determined one of the third request or the fourth request to the data platform.

9. The method of claim 8, wherein the second request comprises an indication of a request for a second page of the first set of data.

10. The method of claim 8, further comprising discarding the first initial subset of data when the first data version identifier and the second data version identifier are not the same.

11. The method of claim 8, wherein:
the first response is associated with a first page of the data;
the second response is associated with a first page of changed data; and
the fourth request is associated with a second page of the changed data.

12. The method of claim 8, wherein:
the first initial subset of data is associated with a first page of the data;
the first subsequent subset of data is associated with a second page of the data; and
the second subsequent subset of data is associated with a third page of the data.

13. The method of claim 12, wherein the second request comprises an indication of the second page and the third request comprises an indication of the third page.

14. The method of claim 8, wherein:
the third request includes the first device identifier; and
the fourth request includes the second device identifier.

15. A method for requesting data from a data platform, the method comprising:
- sending, to the data platform, a first request for a first initial subset of data;
- receiving, from the data platform in response to the first request, a first response comprising the first initial subset of data, a first device identifier, and a first data version identifier associated with the first initial subset of data, wherein the first initial subset of data is associated with a first set of data;
- sending, to the data platform, a second request for a first subset of data from the data platform including the first device identifier from the first response;
- receiving, from the data platform in response to the second request, a second response comprising a first subset of data, a second device identifier, and a second data version identifier associated with the first subset of data;
- determining, based on the first data version identifier and the second data version identifier, which of a third request or a fourth request to generate, the determining comprising:
  - when the first data version identifier and the second data version identifier are the same:
    - determining that the first subset of data is a first subsequent subset of data that is subsequent to the first initial data, such that the first subsequent subset of data is associated with the first set of data; and
    - determining to generate a third request for a second subsequent subset of data from the data platform that includes the first data version identifier to obtain data subsequent to the first subsequent subset of data; and
  - when the first data version identifier and the second data version identifier are not the same:
    - determining that the first subset of data is a second initial subset of data, such that the second initial subset of data is associated with a second set of data different from the first set of data; and
    - determining to generate a fourth request for a third subsequent subset of data from the data platform that includes the second data version identifier to obtain data subsequent to the second initial subset of data; and
- sending the determined one of the third request or the fourth request to the data platform.

16. The method of claim 15, wherein the second request comprises an indication of a second page of the first set of data.

17. The method of claim 15, wherein the set of operations further comprises discarding the first initial subset of data when the first data version identifier and the second data version identifier are not the same.

18. The method of claim 15, wherein:
the first initial subset of data is associated with a first page of the data;
the first subsequent subset of data is associated with a second page of the data; and
the second subsequent subset of data is associated with a third page of the data.

19. The method of claim 18, wherein the second request comprises an indication of the second page and the third request comprises an indication of the third page.

20. The method of claim 15, wherein:
the second initial subset of data is associated with a first page of the second set of data; and
the third subsequent subset of data is associated with a second page of the second set of data.

* * * * *